(12) United States Patent
Lin

(10) Patent No.: US 9,911,011 B1
(45) Date of Patent: Mar. 6, 2018

(54) COMMUNICATIONS DEVICE THAT LOGICALLY CONNECTS AN UPSTREAM SIGNAL LINE TO A DOWNSTREAM SIGNAL LINE

(71) Applicant: Western Digital Technologies, Inc., Irvine, CA (US)

(72) Inventor: Tino Lin, Tustin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 14/547,462

(22) Filed: Nov. 19, 2014

(51) Int. Cl.
G06F 21/78 (2013.01)
G06F 21/81 (2013.01)
G06F 12/14 (2006.01)
G06F 13/40 (2006.01)

(52) U.S. Cl.
CPC .......... *G06F 21/78* (2013.01); *G06F 12/1458* (2013.01); *G06F 21/81* (2013.01); *G06F 13/4068* (2013.01); *G06F 2213/0042* (2013.01)

(58) Field of Classification Search
CPC .......... G06F 21/70; G06F 21/78; G06F 21/81; G06F 13/4063; G06F 13/4068; G06F 12/14; G06F 12/1458; G06F 2213/0042
See application file for complete search history.

(56) References Cited

U.S. PATENT DOCUMENTS

| 7,028,133 | B1 * | 4/2006 | Jackson ................ G06F 13/385 370/906 |
| 7,124,235 | B2 | 10/2006 | Lee et al. |
| 7,701,705 | B1 | 4/2010 | Szeremeta |
| 7,716,384 | B2 * | 5/2010 | Kobayashi ................ G06F 8/60 710/10 |
| 7,765,344 | B2 * | 7/2010 | Wright ................ G06F 13/4022 710/14 |
| 8,064,194 | B2 | 11/2011 | Szeremeta |
| 8,113,873 | B1 | 2/2012 | Sarraf |
| 8,133,426 | B1 | 3/2012 | Yurchenco et al. |
| 8,205,018 | B2 * | 6/2012 | Tauscher ................ G06F 1/266 710/16 |
| 8,219,729 | B1 * | 7/2012 | Wright ................ G06F 13/4022 710/104 |
| 8,358,395 | B1 | 1/2013 | Szeremeta |

(Continued)

OTHER PUBLICATIONS

Johnson, D. "What's the Difference Between USB 2.0 and 3.0 Hubs?" Electronic Design, Mar. 12, 2013. Retrieved from http://electronicdesign.com/embedded/what-s-difference-betwee-usb-20-and-30-hubs. 13 pgs.*

*Primary Examiner* — Zachary A Davis
(74) *Attorney, Agent, or Firm* — Chang & Hale LLP

(57) ABSTRACT

The system describes one aspect of an apparatus configured to implement a security state for preventing access to a storage device, including a communications hub including an upstream port and a plurality of downstream ports. A first downstream port of the plurality of downstream ports is connected to the storage device, and one or more other downstream ports of the plurality of downstream ports are configured to connect to one or more external devices. The apparatus includes one or more processors configured to monitor the upstream port, determine a connection state of the upstream port, and implement the security state for preventing access to the storage device based on the determined connection state.

19 Claims, 3 Drawing Sheets

(56) References Cited

U.S. PATENT DOCUMENTS

| | | |
|---|---|---|
| 8,417,979 B2 | 4/2013 | Maroney |
| 8,462,460 B1 | 6/2013 | Szeremeta et al. |
| 8,498,088 B1 | 7/2013 | Klein |
| 8,547,658 B1 | 10/2013 | Szeremeta |
| 8,769,317 B2 * | 7/2014 | Shih ............... H01M 10/44 455/573 |
| 2008/0005262 A1 | 1/2008 | Wurzburg |
| 2008/0303631 A1 * | 12/2008 | Beekley ............ G06F 21/79 340/5.74 |
| 2011/0307724 A1 * | 12/2011 | Shaw ............... G06F 21/305 713/323 |
| 2011/0314304 A1 * | 12/2011 | Braams ............ G06F 21/79 713/193 |

* cited by examiner

300

Logically Connect an Upstream Signal Line to a Downstream Signal Line Connected to a Storage Device
302

Receive a Signal to Lock the Storage Device when a Change in a Voltage of the Upstream Signal Line is Detected
304

Lock the Storage Device
306

COMMUNICATIONS DEVICE THAT LOGICALLY CONNECTS AN UPSTREAM SIGNAL LINE TO A DOWNSTREAM SIGNAL LINE

BACKGROUND

The universal serial bus (USB) provides a low cost solution for attaching peripheral devices to a host device, such as a host computer (e.g., personal computer such as a laptop or desktop or other host), so that the peripheral devices and the host device can communicate with each other. A compound device is a device that includes an internal USB hub and is able to connect a host device connected to an upstream port with one or more peripheral devices connected to downstream ports. The peripheral devices may include devices such as printers, scanners, keyboards, a mouse, digital cameras, digital video cameras, data acquisition devices, modems, speakers, telephones or video phones, storage devices such as ZIP drives, or other peripherals or devices. In addition, the compound device can include a mass storage device, such as an internal hard disk drive.

When the mass storage device is part of a compound device—internally connected downstream of the USB hub—the upstream port of the compound device is not capable of manual control by the user. That is, the encryption state of the mass storage may not reflect what is intended by the user when the host device is plugged into or unplugged from the upstream port of the compound device.

The system describes one aspect of an apparatus configured to implement a security state for preventing access to a storage device, including a communications hub including an upstream port and a plurality of downstream ports. A first downstream port of the plurality of downstream ports is connected to the storage device, and one or more other downstream ports of the plurality of downstream ports are configured to connect to one or more external devices. The apparatus includes one or more processors configured to monitor the upstream port, determine a connection state of the upstream port, and implement the security state for preventing access to the storage device based on the determined connection state.

DETAILED DESCRIPTION

Figure 1:
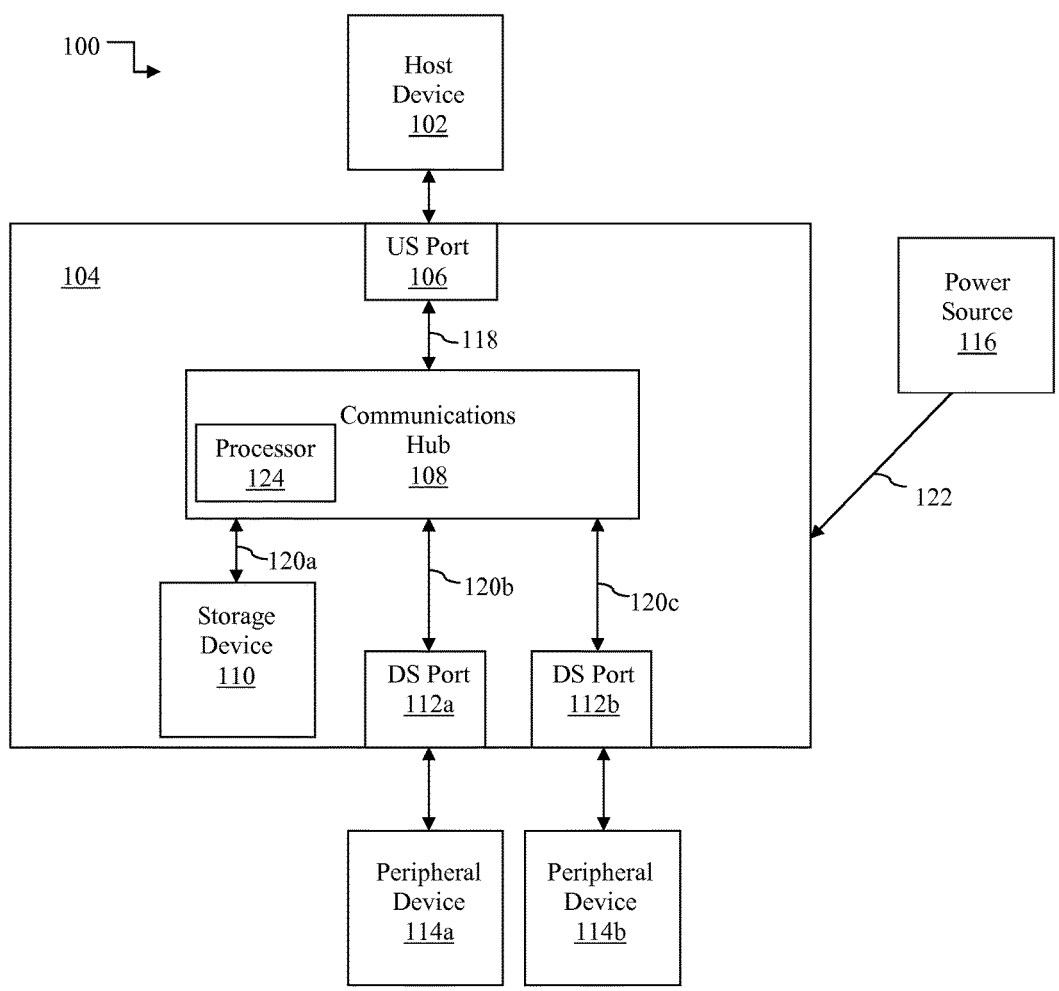
FIG. 1 is a diagram illustrating an exemplary embodiment of a communications device.

The detailed description set forth below in connection with the appended drawings is intended as a description of various exemplary embodiments of the present disclosure and is not intended to represent the only embodiments in which the present disclosure may be practiced. The detailed description includes specific details for the purpose of providing a thorough understanding of the present disclosure. However, it will be apparent to those skilled in the art that the present disclosure may be practiced without these specific details. In some instances, well-known structures and components are shown in block diagram form in order to avoid obscuring the concepts of the present disclosure.

The word "exemplary" is used herein to mean serving as an example, instance, or illustration. Any embodiment described herein as "exemplary" is not necessarily to be construed as preferred or advantageous over other embodiments. Likewise, the term "embodiment" of a device or method does not require that all embodiments of the disclosure include the described components, structure, features, functionality, processes, advantages, benefits, or modes of operation.

In the following detailed description, various aspects of a communications device will be presented. These aspects of a communications device are well suited for controlling an encryption state of a mass storage device internally connected downstream of a communications hub when a host device is plugged into or unplugged from an upstream port. Those skilled in the art will realize that these aspects may be extended to all types of media storage devices including, but not limited to, an external hard drive, a laptop computer, a personal computer (PC), a smart phone, a tablet device, a personal digital assistant, or a compound device. Accordingly, any reference to a specific device is intended only to illustrate the various aspects of the present disclosure, with the understanding that such aspects may have a wide range of applications.

Several aspects of a communications device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The system describes one aspect of an apparatus configured to implement a security state for preventing access to a storage device, including a communications hub comprising an upstream port and a plurality of downstream ports, wherein a first downstream port of the plurality of downstream ports is connected to the storage device, and further wherein one or more other downstream ports of the plurality of downstream ports are configured to connect to one or more external devices. The apparatus comprises one or more processors configured to monitor the upstream port, determine a connection state of the upstream port, and implement the security state for preventing access to the storage device based on the determined connection state.

One aspect of a method of implementing a security state for preventing access to a storage device includes providing a communications hub comprising an upstream port and a plurality of downstream ports, wherein a first downstream port of the plurality of downstream ports is connected to the storage device, and further wherein one or more other downstream ports of the plurality of downstream ports are configured to connect to one or more external devices; monitoring the upstream port; determining a connection state of the upstream port; and implementing the security state for preventing access to the storage device based on the determined connection state.

It will be understood that other aspects of the present disclosure will become readily apparent to those skilled in the art from the following detailed description, wherein it is shown and described in several embodiments of the disclosure by way of illustration. As will be realized by those skilled in the art, the present disclosure is capable of other and different embodiments and its several details are capable of modification in various other respects, all without departing from the spirit and scope of the disclosure.

FIG. 1 is a diagram illustrating an exemplary embodiment of a communications system 100 including a host device 102, a communications device 104, and a plurality of peripheral devices 114a, 114b. For example, the host device 102, the communications device 104, and the peripheral devices 114a, 114b can each include a device such as an external hard drive, a laptop computer, a personal computer (PC), a smart phone, a tablet device, a personal digital assistant, or a compound device. In an exemplary embodiment, the communications device 104 can be an external hard drive that includes a communications hub 108 configured to connect to the host device 102 via upstream port 106 and upstream signal line 118. The peripheral devices 114a, 114b connected to the respective downstream ports 112a, 112b can be connected to the communications hub 108 via downstream signal lines 120b, 120c. For example, upstream port 106 and downstream ports 112a, 112b can each include a port such as a USB-type port, a THUNDERBOLT™ type port, a FIREWIRE™ type port (e.g., an IEEE 1394 interface), a digital visual interface port, a DISPLAYPORT™ type port, an external serial advanced technology attachment (eSATA) port, a PS/2 port, a serial port, a video graphics array (VGA) port, a small computer system interface (SCSI) port, a high-definition multimedia interface (HDMI), and/or an audio port. With further reference to FIG. 1, the communications device 104 can be connected to an external power source 116 (e.g., a wall outlet alternating current source), and can optionally include an internal power source such as a battery (not shown) that is configured to power the communications device 104 when it is not connected to the external power source 116.

Still referring to FIG. 1, the communications hub 108 can, in an exemplary embodiment, be a universal serial bus (USB) hub. In this manner, communications device 104 can act to expand the number of USB ports in the communications system 100 by providing additional USB port connectivity to the host device 102 with downstream ports 112a, 112b that can connect peripheral devices 114a, 114b (e.g., a mouse, keyboard, a daisy chain of external hard drives, etc.) to the host device 102 via the communications hub 108. In an exemplary embodiment, the peripheral devices 114a, 114b connected to the downstream ports 112a, 112b can receive a charge from the communications device 104. In this way, the functionality of the communications device 104 can be expanded to include acting as a charging station for a user's peripheral devices. Although two downstream ports 112a, 112b are illustrated in the communications device 104 of FIG. 1, it is understood that a single downstream port or more than two downstream ports can be included in the communications device 104, without departing from the scope of the present disclosure.

With continued reference to FIG. 1, an internal storage device 110 can be connected downstream of the communications hub 108 via signal line 120a. For example, the internal storage device 110 can be an internal hard disk drive or an internal solid state drive of the communications device 104. Although only a single storage device 110 is illustrated in FIG. 1, it is understood that a plurality of internal storage devices may be included downstream of the communications hub 108 without departing from the scope of the present disclosure. In an exemplary embodiment, the downstream signal line 120a that connects the communications hub 108 to the internal storage device 110 can be logically connected to the upstream signal line 118 that connected to the upstream port 106.

The communications hub 108 can include one or more processors 124 that can implement various processes for the communications device 104. Although the processors 124 are illustrated as being part of the communications hub 108, it is understood by one of ordinary skill in the art that the one or more processors 124 may be external to the communications hub 108. In an exemplary embodiment, the processor 124 of the communications hub 108 can be configured such that when a user disconnects the host device 102 from the upstream port 106, the desired security state can be implemented with respect to the internal storage device 110. In this way, the internal storage device 110 can enter a locked state when the host device 102 is disconnected from the upstream port 106, but the communication hub 108 will not implement a security state with respect to downstream ports 112a, 112b. This can enable the communications device 104 to continue charging the peripheral devices 114a, 114b connected to the downstream ports 112a, 112b when the host device 102 is disconnected from the upstream port 106 and the internal storage device 110 is in a locked security state.

Still referring to FIG. 1, the processor 124 of the communications hub 108 can monitor a voltage of the signal line 118 to determine a connection state of the upstream port 106. For example, when the monitored voltage of the signal line is +5V, then the processor 124 of the communications hub 108 determines that the host device 102 is connected to the upstream port 106. Alternately, when the monitored voltage of the signal line 118 is 0V, then the processor 124 of the communications hub 108 determines that the host device 102 is not connected to the upstream port 106. In an instance when the host device 102 has been disconnected from the upstream port 106 (e.g., when it is determined that the voltage of the upstream signal line 118 transitions from +5V to 0V), the processor 124 of the communications hub 108 can implement a security state with respect to the storage device 110. For example, implementing the security state can include locking the storage device 110 such that the storage device 110 will not be accessible to a host device that connects to the upstream port 106 without a user entering an appropriate password. In this manner, an unauthorized user can be prevented from accessing information stored in storage device 110. That is, when the processor 124 of the communications hub 108 determines that a host device has connected to the upstream port 106 (e.g., when it is determined that the voltage of the upstream signal line 118 transitions from 0V to +5V), the processor 124 of the communications hub 108 can be configured to require a password to be entered at a host device before the host device is allowed access to storage device 110. However, since the upstream signal line 118 is only logically connected to the downstream signal line 120a that connects the storage device 110 to the communications hub 108, the signal lines 120b, 120c that are connected to the downstream ports 112a, 112b are not locked, and charging of the peripheral devices 114a, 114b can continue when the storage device is in a locked security state.

Figure 2:
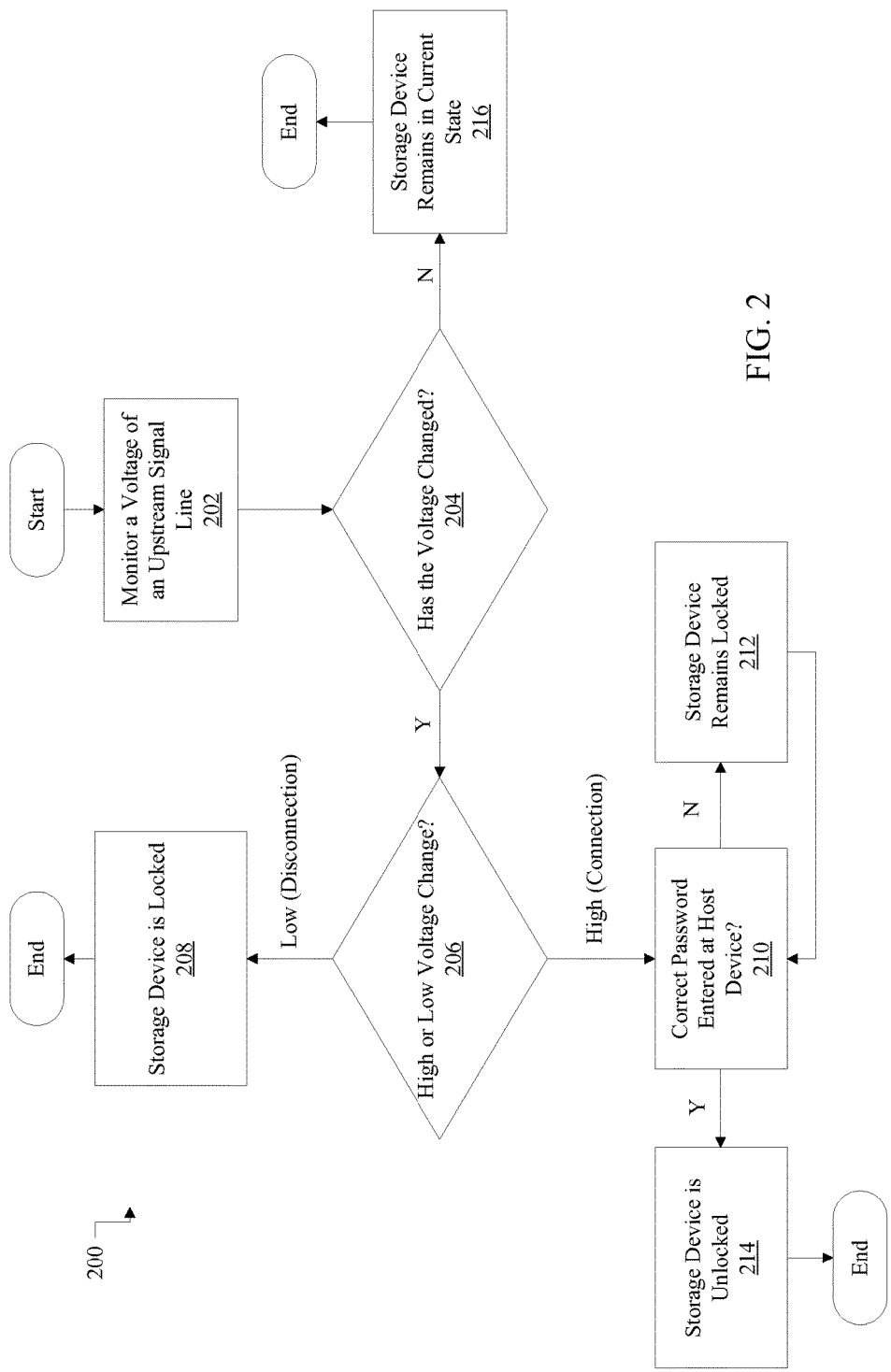
FIG. 2 is a flowchart illustrating an exemplary embodiment of implementing a security state for preventing access to a storage device.

FIG. 2 is a flowchart 200 illustrating an exemplary embodiment of implementing a security state for preventing access to a storage device. Each of the steps in the flowchart can be controlled using one or more processors of a communications device or by some other suitable means. For example, the steps can be controlled using the processor 124 of the communications hub 108 illustrated in FIG. 1. The process can start when the voltage of an upstream signal line of a communications device is monitored, as represented by block 202. For example, the voltage of the upstream signal line 118 can be continuously monitored or monitored at predetermined intervals. With reference to FIG. 1, the communications hub 108 can monitor a connection state of the upstream port 106 by monitoring a voltage of the upstream signal line 118 that connects the communications hub 108 to upstream port 106. In an exemplary embodiment, the upstream signal line 118 can be logically connected to a downstream signal line 120a connected to an internal storage device 110. As represented by block 204, it can be determined if the monitored voltage of upstream signal line has changed. If it is determined that the voltage of the upstream signal line 118 has changed, then as represented by block 206, the communications hub 108 can determine if the voltage of the upstream signal line 118 has changed from a high voltage state (e.g., +5V) to a low voltage state (e.g., 0V) or vice versa. In an exemplary embodiment, a change in the voltage of the upstream signal line 118 from a high voltage state to a low voltage state represents that the host device 102 has been disconnected from the upstream port 106. Conversely, a change in the voltage of the upstream signal line 118 from a low voltage state to a high voltage state represents that the host device 102 has been connected to the upstream port 106. As represented by block 208, when the communications hub 108 determines that the voltage of the upstream signal line 118 has changed to a low voltage state (e.g., disconnection of the host device 102), then the internal storage device 110 located downstream of the communications hub 108 will either enter a locked state (e.g., if the host device 102 had access to the internal storage device 110) or remain in a locked state (e.g., if the host device 102 did not have access to the internal storage device 110). At this point, the process can end until the process starts again. However, when the communications hub 108 determines that the voltage of the upstream signal line 118 has changed to a high voltage state (e.g., connection of the host device 102), then as represented by block 210, the communications hub 108 can require that a password be entered at the host device 102 before the host device 102 can gain access to the internal storage device 110 located downstream of the communications hub 108. When the correct password is not entered at the host device 120, then as represented by block 212, the internal storage device 110 remains locked and is inaccessible to the host device 102. However, when the correct password is entered at the host device 102, then the internal storage device 110 is unlocked and is accessible to the host device 120, as represented by block 214. At this point, the process can end until the process starts again.

Referring again to block 204, when it is determined that the voltage of the upstream signal line 118 has not changed, then the internal storage device 110 remains in its current state (e.g., either locked or unlocked), as represented by block 216. At this point, the process can end until the process starts again. During periods when the internal storage device 110 is in a locked state, external peripheral devices 114a, 114b connected downstream of the communications hub 108 can still receive charge since the signal lines that are connected to the downstream ports 120b, 120c are not logically connected to the upstream port 106.

Figure 3:
FIG. 3 is a flowchart illustrating an exemplary embodiment for locking a storage device.

FIG. 3 is a flowchart 300 illustrating an exemplary embodiment for locking an internal storage device 110 of a communications device 104, such as the one illustrated in FIG. 1. Each of the steps in the flow chart can be controlled using one or more processors of a storage device or by some other suitable means. For example, the steps can be controlled using the processor 124 of the communications hub 108 illustrated in FIG. 1. As represented by block 302, an upstream signal line can be logically connected to a downstream signal line connected to the storage device. For example, with reference to FIG. 1, the upstream signal line 118 that connects the upstream port 106 to the communications hub 108 can be logically connected to the downstream signal line 120a that connects the communications hub 108 to the internal storage device 110. As represented by block 304, a signal can be received to lock the internal storage device 110 when a change in the voltage of the upstream signal line is detected. For example, referring to FIG. 1, when the voltage of the upstream signal line 118 transitions from +5V to 0V a signal can be sent from the communications hub 108 to the storage device indicating that the storage device should enter a locked state. When the signal is received, the storage device is locked, as represented by block 306. By locking the internal storage device 110 when the voltage of the upstream signal line 118 changes, an unauthorized user can be prevented from accessing the internal storage device 110.

The various aspects of this disclosure are provided to enable one of ordinary skill in the art to practice the present disclosure. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus configured to implement a security state for preventing access to internal storage by a connected host device, comprising:
    an internal storage device;
    an upstream port configured to communicate with the connected host device;
    a plurality of downstream ports, wherein:
        a first downstream port of the plurality of downstream ports is connected to the internal storage device; and
        one or more other downstream ports of the plurality of downstream ports are configured to connect to one or more external devices; and
    a communications hub connecting the upstream port to the plurality of downstream ports, the communications hub configured to:
        monitor the upstream port;
        determine a connection state of the upstream port;
        implement the security state for preventing access to the internal storage device by the host device based on the determined connection state; and
        maintain power to the one or more external devices when the security state is implemented for preventing access to the internal storage device.

2. The apparatus of claim 1, wherein:
the communications hub comprises an upstream signal line connected to the upstream port and a downstream signal line connected to the first downstream port.

3. The apparatus of claim 1, wherein the communications hub is further configured to:
    monitor a voltage of an upstream signal line connected to the upstream port; and
    determine if the voltage of the upstream signal line has changed.

4. The apparatus of claim 3, wherein the communications hub is further configured to determine if the voltage has changed from a high voltage state to a low voltage state or from a low voltage state to a high voltage state when it is determined that the voltage of the upstream signal line has changed.

5. The apparatus of claim 4, wherein the communications hub is further configured to lock the internal storage device when it is determined that the voltage of the upstream signal line has changed from the high voltage state to the low voltage state.

6. The apparatus of claim 4, wherein the communications hub is further configured to implement a password protected security state when it is determined that the voltage of the upstream signal line has changed from the low voltage state to the high voltage state.

7. The apparatus of claim 6, wherein the password protected security state maintains the internal storage device in a locked state until a signal is received to unlock the internal storage device.

8. The apparatus of claim 3, wherein the communications hub is configured to maintain the internal storage device in its current security state when it is determined that the voltage of the upstream signal line has not changed.

9. The apparatus of claim 1, wherein the communications hub is configured to implement the security state by changing a security state of the first downstream port connected to the internal storage device.

10. The apparatus of claim 1, wherein the internal storage device comprises at least one of a hard disk drive and a solid state drive.

11. A method of implementing a security state for an apparatus comprising an internal storage device, an upstream port configured to communicate with a connected host device, a plurality of downstream ports, and a communications hub connecting the upstream port with the plurality of downstream ports, wherein a first downstream port of the plurality of downstream ports is connected to the internal storage device, and further wherein one or more other downstream ports of the plurality of downstream ports are configured to connect to one or more external devices, the method comprising:
    monitoring the upstream port;
    determining a connection state of the upstream port;
    implementing the security state for preventing access to the internal storage device based on the determined connection state; and
    maintaining power to the one or more external devices when the security state is implemented for preventing access to the internal storage device.

12. The method of claim 11, wherein:
    monitoring the upstream port includes monitoring a voltage of an upstream signal line connected to the upstream port; and
    determining the connection state of the upstream port includes determining if the voltage of the upstream signal line has changed.

13. The method of claim 12, wherein determining the connection state of the upstream port further comprises determining if the voltage has changed from a high voltage state to a low voltage state or from a low voltage state to a high voltage state when it is determined that the voltage of the upstream signal line has changed.

14. The method of claim 13, wherein implementing the security state includes locking the internal storage device when it is determined that the voltage of the upstream signal line has changed from the high voltage state to the low voltage state.

15. The method of claim 13, wherein implementing the security state includes implementing a password protected security state when it is determined that the voltage of the upstream signal line has changed from the low voltage state to the high voltage state.

16. The method of claim 15, wherein the password protected security state maintains the internal storage device in a locked state until a signal is received to unlock the internal storage device.

17. The method of claim 12, wherein implementing the security state includes maintaining the internal storage device in its current security state when it is determined that the voltage of the upstream signal line has not changed.

18. The method of claim 11, wherein implementing the security state comprises changing a security state of the first downstream port connected to the internal storage device.

19. The method of claim 11, wherein the internal storage device comprises at least one of a hard disk drive and a solid state drive.

* * * * *